United States Patent
Wang et al.

(10) Patent No.: US 11,323,541 B2
(45) Date of Patent: May 3, 2022

(54) DATA DETERMINISTIC DELIVERABLE COMMUNICATION TECHNOLOGY BASED ON QOS AS A SERVICE

(71) Applicant: Huawei Technologies Co., Ltd., Shenzhen (CN)

(72) Inventors: Guoli Wang, Munich (DE); Shiqing Fan, Munich (DE); Veaceslav Falico, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/075,397

(22) Filed: Oct. 20, 2020

(65) Prior Publication Data
US 2021/0037113 A1 Feb. 4, 2021

Related U.S. Application Data

(63) Continuation of application No. PCT/EP2018/086599, filed on Dec. 21, 2018.

(51) Int. Cl.
*H04L 67/61* (2022.01)
*H04L 67/1008* (2022.01)
*H04L 67/62* (2022.01)

(52) U.S. Cl.
CPC ........ *H04L 67/322* (2013.01); *H04L 67/1008* (2013.01); *H04L 67/325* (2013.01)

(58) Field of Classification Search
CPC .. H04L 67/322; H04L 67/1008; H04L 67/325
See application file for complete search history.

(56) References Cited

U.S. PATENT DOCUMENTS

| | | | | |
|---|---|---|---|---|
| 8,255,915 B1 * | 8/2012 | Blanding | ............. | G06F 9/5027 718/104 |
| 8,365,177 B2 * | 1/2013 | Chan | .................... | G06F 9/4881 718/103 |
| 8,782,655 B2 * | 7/2014 | Blanding | ............. | G06F 9/5005 718/104 |

(Continued)

FOREIGN PATENT DOCUMENTS

WO    2013023494 A1    2/2013

OTHER PUBLICATIONS

"The Real-time Publish-Subscribe Protocol (RTPS) DDS Interoperability Wire Protocol Specification," Version 2.2, retrieved from the internet:https://www.omg.org/spec/DDSI-RTPS/2.2, total 210 pages (Sep. 2014).

(Continued)

*Primary Examiner* — Jerry B Dennison
(74) *Attorney, Agent, or Firm* — Leydig, Voit & Mayer, Ltd.

(57) ABSTRACT

A data processing method includes determining whether or not it is possible to perform a new processing task within the new processing task's time limit if execution of one or more current processing tasks is continued based on the one or more current processing tasks' configurations. In case the new task's performing is determined not to be possible within the new task's time limit, resources are released from the current tasks so as to still enable performing the current tasks within their respective time limits.

9 Claims, 11 Drawing Sheets

(56) References Cited

U.S. PATENT DOCUMENTS

| | | | |
|---|---|---|---|
| 9,734,817 B1* | 8/2017 | Putrycz | G10L 13/04 |
| 10,261,833 B2* | 4/2019 | Shakya | G06F 9/4887 |
| 10,628,221 B1* | 4/2020 | Veprinsky | G06F 9/5038 |
| 2006/0056618 A1* | 3/2006 | Aggarwal | G06Q 10/0631 |
| | | | 380/1 |
| 2009/0265450 A1* | 10/2009 | Helmer | H04L 41/0893 |
| | | | 709/221 |
| 2010/0241751 A1* | 9/2010 | Sonoda | G06F 9/50 |
| | | | 709/226 |
| 2010/0281285 A1* | 11/2010 | Blanding | G06F 9/5027 |
| | | | 713/324 |
| 2011/0106934 A1* | 5/2011 | Sadasivan | H04L 41/0893 |
| | | | 709/223 |
| 2011/0185364 A1* | 7/2011 | Fernandes | G06F 9/5083 |
| | | | 718/104 |
| 2011/0231853 A1* | 9/2011 | Murray | G06F 9/50 |
| | | | 718/103 |
| 2012/0046984 A1* | 2/2012 | Benayon | G06Q 10/06311 |
| | | | 705/7.13 |
| 2013/0263148 A1* | 10/2013 | Brueggen | G06F 9/5016 |
| | | | 718/104 |
| 2014/0082403 A1 | 3/2014 | Kraev | |
| 2016/0142321 A1* | 5/2016 | Gage | H04W 76/10 |
| | | | 370/235 |
| 2017/0180469 A1* | 6/2017 | Ford | H04L 67/1008 |
| 2018/0159801 A1* | 6/2018 | Rajan | H04L 45/302 |
| 2018/0255137 A1* | 9/2018 | Hu | H04L 67/30 |
| 2019/0155657 A1* | 5/2019 | An | G06F 9/5038 |
| 2019/0332440 A1* | 10/2019 | Smaldone | H04L 43/0876 |
| 2020/0104230 A1* | 4/2020 | Hasija | G06F 9/4881 |
| 2021/0037113 A1* | 2/2021 | Wang | H04L 67/322 |
| 2021/0109796 A1* | 4/2021 | Fozard | G06N 3/02 |
| 2021/0166339 A1* | 6/2021 | Mann | G06T 13/80 |
| 2021/0173709 A1* | 6/2021 | Rusev | G06F 9/3836 |
| 2021/0228560 A1* | 7/2021 | Lukas | A61K 45/06 |
| 2021/0409538 A1* | 12/2021 | Zhu | H04M 1/72454 |

OTHER PUBLICATIONS

"Data Distribution Service (DDS)" Version 1.4, OMG Document No. formal/Apr. 10, 2015, retrieved from the internet: https://www.omg.org/spec/DDS/1.4, total 180 pages. (Apr. 2015).

* cited by examiner

Fig. 10A

Task1 | 0.1 | 0.1 | 0.1 | 0.1 | 0.1 | 0.1 | 0.1 | 0.1 | 0.1 | 0.1 |

Fig. 10B

Task1 Deadline

Task2 Deadline

Task1 | 0.1 | 0.1 | 0.1 | 0.1 | 0.1 | 0.1 | 0.1 | 0.1 | 0.1 | 0.1 |

Task2 | 0.1 | 0.1 | 0.1 | 0.1 | 0.1 | 0.1 | 0.1 | 0.1 | 0.1 | 0.1 |

Fig. 10C

Resources between deadlines

Task3 Deadline

Task1 | 0.1 | 0.1 | 0.1 | 0.1 | 0.1 | 0.1 | 0.1 | 0.1 | 0.1 | 0.1 |

Task2 | 0.1 | 0.1 | 0.1 | 0.1 | 0.1 | 0.1 | 0.1 | 0.1 | 0.1 | 0.1 |

Task3 | 0.1 | 0.1 | 0.1 |

DATA DETERMINISTIC DELIVERABLE COMMUNICATION TECHNOLOGY BASED ON QOS AS A SERVICE

CROSS-REFERENCE TO RELATED APPLICATIONS

This application is a continuation of International Application No. PCT/EP2018/086599, filed on Dec. 21, 2018, the disclosure of which is hereby referenced in its entirety.

FIELD

The present disclosure relates to resource scheduling in computing systems.

BACKGROUND

The DDS (Data Distribution Service or Distributed Data Service) standard defines the interface and behavior of data publication, transmission, and subscription in a real time distributed system, e.g. autonomous driving (see FIG. 1 for the sensors of an autonomous "driver"/vehicle and a fusion ECU (electronic control unit) for fusing the data obtained from the various sensors). DDS uses UML (unified modeling language) language description service, and provides a platform irrelevant or platform independent data model, which is able to be mapped to other specific platforms and programming languages. The DDS standard defined formally a full and complete set of QoS (Quality of Service) policies, every communication entity has its own QoS policy, and every pair of publisher and subscriber may create a standalone QoS. So, DDS is able to configure and manipulate system resources, coordinate the balance between predictability and execution efficiency, and support the requirements of complex and varied data stream. DDS provides 22 QoS in total, including several main functionalities like data stream control, data persistency, communication pattern, and support of fault tolerance. (see FIG. 2 for an overview of QoS in DDS, where RxO means "requested vs. offered" and "DW" and "DR" denote "data writer" and "data reader", respectively). The extended QoS policy realizes a deeper control, for example, control on the discovery procedure of communication peers, control on the system resource usage.

DDS is associated with a large number of QoS (as shown by FIG. 2), exposure to external, difficulties to use and learn for users, and the complexity of the QoS mutually exclusive relationship. The DDS standard defines the basic data structure, parameter types, and basic execution flow for the publisher and subscriber middleware, but the specific implementation architecture is not clearly defined. It may be centralized (FIG. 3), decentralized (FIG. 4), or a hybrid architecture.

OpenStack is a combination of open source tools for constructing and managing public and private cloud using resource pool virtualization. The main projects are responsible for processing core cloud computing service, including computing, network, storage, identity and image service. Meanwhile, there are several optional projects for users to be bundled to create special and deployable cloud architecture.

OpenStack supports for two kinds of QoS (FIG. 5), quality and quantitative control. Quality control satisfies the requirements of different applications by providing hardware devices of different performance. Quantitative control strictly controls the flow of application.

Docker is an open source tool that can encapsulate any applications and run them in a Linux container. A sandbox based on Docker can realize lightweight isolation and avoid effects between multiple containers. Docker can automatically package and deploy any application for creating a lightweight private PaaS (platform-as-a-service) cloud, or for constructing a development environment for deploying extensible web applications. Docker has limited QoS implementation, but rather uses Linux cgroup to configure the system resources (FIG. 6).

OpenStack as well as Docker support only single point resource QoS, and they do not provide a functionality for global QoS configuration policy. Further, they do not provide any support of real-time, reliability guarantee for E2E (end-to-end) business.

In a "traditional" (i.e. conventional) IP (Internet Protocol) network, all the packets are treated in the same way, i.e. every forwarding device processes the packets using FIFO (first-in-first-out) policy, and transfers packets to the destination using Best Effort. However, this does not provide any guarantee of the reliability, latency, and so on. There are two additional classical models, namely Differentiated and Integrated service models.

Best Effort is a single and simple service model. The application can send any amount of packets at any time without getting the permission or notifying the network. The service only guarantees the usability if the E2E connectivity is given, and sends the packets as many as possible. However, Best Effort does not provide for and guarantee latency and reliability.

When using Differentiated service model, services are isolated and aggregated according to the domain scope, and the Differentiated service model contains only limited business levels, so it provides for reduced state information, easy realization, and extensibility. In this service model, different QoS requirements can be satisfied. Before an application sends the packets, it does not need to preserve any resource, and the network does not need to maintain the status for each stream.

The Integrated service model preserves network resources according to the requirement of business QoS, in order to ensure the service quality of E2E data stream. The network preserves resources to satisfy the requirements based on the flow parameters.

SUMMARY

According to a general aspect, the present disclosure provides a data processing method. The data processing method comprises: receiving a new processing task to be performed within a new processing task's time limit while one or more current processing tasks, which have been scheduled respectively based on one or more current processing tasks' configurations and which are to be performed respectively within one or more current processing tasks' time limits, are being executed on one or more current processing tasks' scheduled resources; determining whether or not it is possible to perform the new processing task within the new processing task's time limit if execution of the one or more current processing tasks is continued based on the one or more current processing tasks' configuration; in case it is determined that it is not possible to perform the new processing task within the new processing task's time limit if execution of the one or more current processing tasks is continued based on the one or more current processing tasks' configurations, partially releasing the one or more current processing tasks' scheduled resources so as to still enable performing the one or more current processing tasks respectively within the one or more processing tasks' time limits on one or more processing task's remaining resources; performing the one or more current processing tasks on the one or more processing tasks' remaining resources; and performing the new processing task on released resources obtained by the partially releasing of the one or more current tasks' scheduled resources.

This facilitates enabling efficient resource usage and faster accomplishment of data processing tasks.

In some embodiments, the method further comprises, if it is determined that it is possible to perform the new processing task within the new processing task's time limit if execution of the one or more current processing tasks is continued on the one or more current processing tasks' scheduled resources, continuing execution of the one or more current processing tasks on the one or more processing tasks' scheduled resources.

For instance, a minimum of the one or more processing tasks' remaining resources is calculated as:

(total data volume−already processed data volume)/
(data rate*remaining time within current processing task's time limit)

respectively per one or more current processing task, wherein the data rate is based on the respective current processing task's configuration, and the resources obtained by releasing the one or more current processing tasks' resources are the difference between the one or more current processing tasks' scheduled resources and the one or more current processing tasks' remaining resources.

In some embodiments, the processing method further comprises translating the new processing task and the new processing task's time limit into a quality of service, QoS, requirement.

In some embodiments, the new processing task and the one or more current processing tasks are performed within a resource scheduling simulation.

This enables determining various resource configurations and facilitates training of resource scheduling.

For instance, the method further includes measuring resources on which the new processing task is performed, based on the measured resources, obtaining a new processing task's configuration, adding the new processing task's configuration to a library.

This facilitates training of resource scheduling.

In some embodiments, at least one of the new processing task and the one or more current processing tasks is a communication task.

For instance, the data processing method includes determining a communication path including a plurality of nodes by which data is to be transferred. The data is processed on a first node among the plurality of nodes by performing the new processing task. The data processing method comprises selecting a communication protocol for forwarding the data to a second node, and after performing of the new processing task, forwarding the data to the next node using the selected communication protocol.

This facilitates transferring data in a network on a most resource-efficient data path.

According to some embodiments, the present disclosure provides a computer program comprising instructions which, when the program is executed by a computer, cause the computer to carry out the steps of any of the above methods of the data processing method.

According to some embodiments, provided is a data carrying or having stored thereon the computer program.

In some embodiments, the data carrier is a non-transitory computer-readable medium thereon the computer program.

In some embodiments, the data carrier is a data carrier signal carrying the computer program.

In further embodiments, provided is a data processing system comprising processing circuitry adapted to carry out: receiving a new processing task to be performed within a new processing task's time limit while one or more current processing tasks, which have been scheduled respectively based on one or more current processing tasks' configurations and which are to be performed respectively within one or more current processing tasks' time limits, are being executed on one or more current processing tasks' scheduled resources; determining whether or not it is possible to perform the new processing task within the new processing task's time limit if execution of the one or more current processing tasks is continued based on the one or more current processing tasks' configurations; in case it is determined that it is not possible to perform the new processing task within the new processing task's time limit if execution of the one or more current processing tasks is continued based on the one or more current processing tasks' configurations, partially releasing the one or more current processing tasks' scheduled resources so as to still enable performing the one or more current processing tasks respectively within the one or more processing tasks' time limits on one or more processing task's remaining resources; performing the one or more current processing tasks on the one or more processing tasks' remaining resources; and performing the new processing task on released resources obtained by the partially releasing of the one or more current tasks' scheduled resources.

In an embodiment, the data processing system is a network node.

In an embodiment, the data processing system comprises a plurality of network nodes.

In some embodiments, the processing circuitry is adapted to carry out, if it is determined that it is possible to perform the new processing task within the new processing task's time limit if execution of the one or more current processing tasks is continued on the one or more current processing tasks' scheduled resources, continuing execution of the one or more current processing tasks on the one or more processing tasks' scheduled resources.

A minimum of the one or more processing tasks' remaining resources may be calculated as:

(total data volume−already processed data volume)/
(data rate*remaining time within current processing task's time limit)

respectively per one or more current processing task, wherein the data rate is based on the respective current processing task's configuration, and the resources obtained by releasing the one or more current processing tasks' resources are the difference between the one or more current processing tasks' scheduled resources and the one or more current processing tasks' remaining resources.

For example, the processing circuitry is adapted to carry out translating the new processing task and the new processing task's time limit into a quality of service, QoS, requirement.

In some exemplary embodiments, the processing circuitry is adapted to carry out performing the new processing task and the one or more current processing tasks within a resource scheduling simulation.

For example, data processing system further includes a memory adapted to store a library, and the processing circuitry is adapted to carry out measuring resources on which the new processing task is performed, based on the measured resources, obtaining a new processing task's configuration, and adding the new processing task's configuration to a library.

In some embodiments, at least one of the new processing task and the one or more current processing tasks is a communication task.

For instance, the processing circuitry is adapted to carry out determining a communication path including a plurality of nodes by which data is to be transferred; wherein the data is processed on a first node among the plurality of nodes by performing the new processing task, and the data processing method comprises selecting a communication protocol for forwarding the data to a second node, and after performing of the new processing task, forwarding the data to the next node using the selected communication protocol.

BRIEF DESCRIPTION OF DRAWINGS

FIGS. 10A-C illustrate a scheduling algorithm in accordance with a processing method;

FIG. 12 illustrates a scheduling algorithm in accordance with a processing method; and FIG. 13 illustrates a scheduling algorithm in accordance with a processing method.

DETAILED DESCRIPTION

This disclosure facilitates customized QoS integration vertically, configurable resource scheduling horizontally, in order to ensure reliability of different applications' requirements, communication performance and resource consumption in scenarios like IoT (internet of things), autonomous driving, edge computing, and cloud applications.

Figure 7:
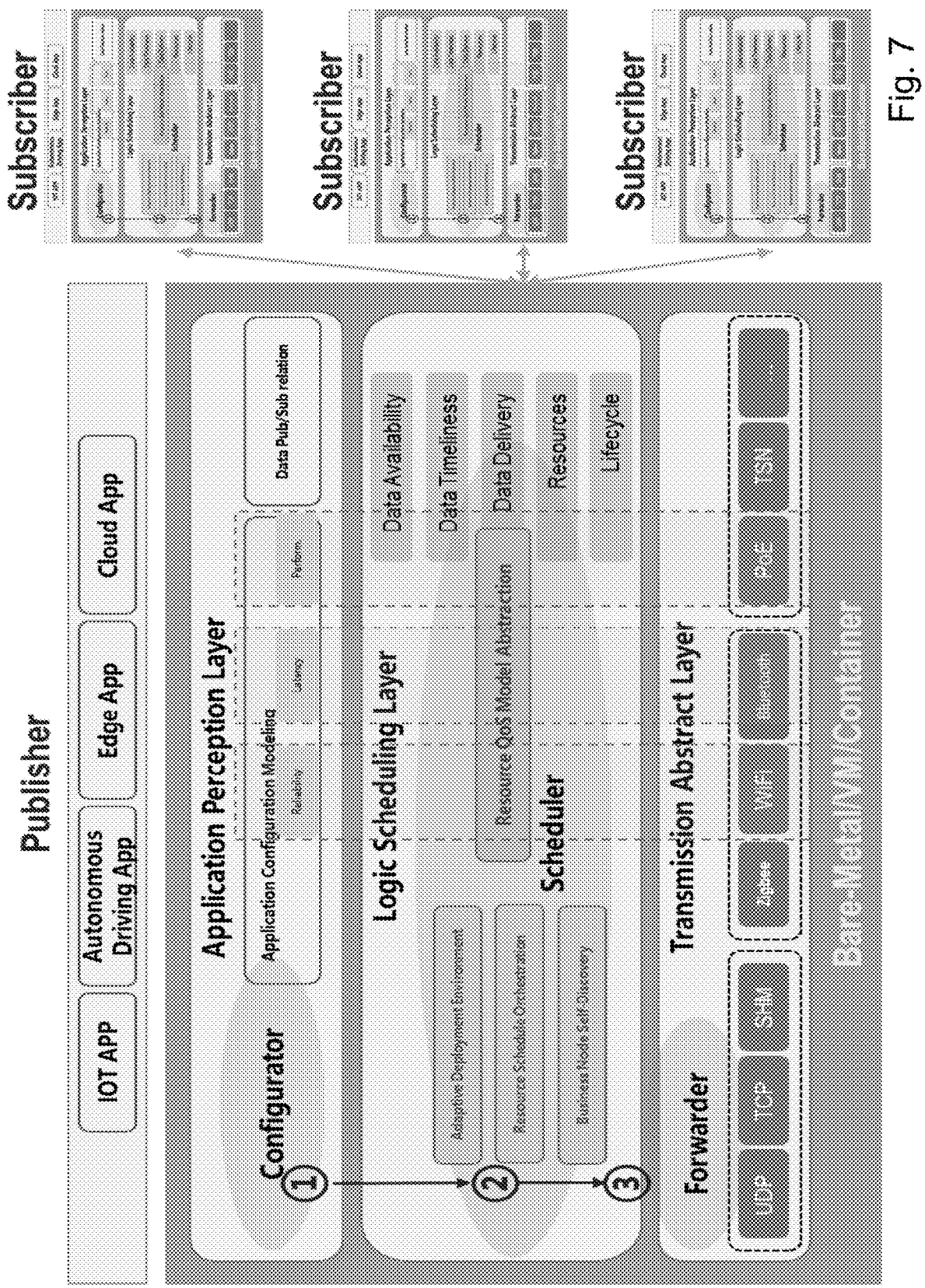
FIG. 7 is a graph showing a software architecture.

Some embodiments of the present disclosure provide an extension of the DDS architecture into three layers shown in FIG. 7, namely Application Perception Layer (configurator), Logical Scheduling Layer (scheduler), and Transmission Abstraction Layer (forwarder). These vertically integrated layers define the QoS service functionality, and realize the resource scheduling horizontally, as shown in the FIG. 7.

The description of each functional module in the related software architecture is as follows.

The Application Perception Layer works as the configurator for the user application, and provides a configuration interface to define criteria like application perception, the required latency, performance, reliability, etc.

Configuration modeling provides a modeling tool and interface ("Application Configuration Modeling" in FIG. 7), and facilitates enabling a functionality of adaptive deployment environment, resource schedule orchestration, and the business node self-discovery, in order to accomplish the entire scheduling.

Data subscribes and publisher modules may for instance be used for processing the message subscription and publish function between communication nodes.

The Logical Scheduling Layer works as an internal scheduler that links Application Perception Layer and Transmission Abstraction Layer for DDS. It is a function of the Logical Scheduling Layer to adaptively configure a node environment (e.g. of a network node), including bare-metal (e.g. physical or single-tenant server), virtual machine and container related configurations, and to abstract the system physical core and logical resources according to the logical resource scheduling algorithm and self-discovery and self-connection functions of the communication peers. The resource scheduler includes an adaptive deployment environment module, resource schedule orchestration module and the business node self-discovery module. It cooperates with QoS model abstraction, and realizes the conversion and abstraction of the relationship between upper layer application and the corresponding QoS.

The modules of the Logical Scheduling Layer are described as follows:

The resource QoS abstraction module targets at the existing QoS of DDS, abstracts the upper layer configuration model, and accomplishes the automatic conversion from Application Perception Layer to Logical Scheduling Layer, in order to properly schedule and orchestrate the system resources.

The adaptive deployment environment module abstracts and integrates different hardware (e.g. X86, ARM), software and system environment (e.g. Linux, eulerOS, Hongmeng), in order to adaptively accomplish dynamical deployment, meanwhile the procedure is not sensitive to the upper layer applications.

The resource schedule orchestration module is the core functional module in the configurator, which depends on the system resource abstraction generated from adaptive deployment environment module, and accomplishes scheduling of a task on system resource.

The business node self-discovery module works for the self-discovery for new or stopped business nodes (e.g. temporarily stopped/inactive business nodes), and dynamically updates the communication node list and topology, in order to provide the weight of the communication network as the basis of precise scheduling and orchestration for the deployment environment adaptively module.

The Transmission Abstraction Layer works as a lower layer forwarding module in the whole software architecture. It supports multiple transport protocols (irrespective of a particular protocol), and multiple communication devices (irrespective of particular hardware), for example, communication devices like Bluetooth, Wi-Fi, network cards, ZigBee as well machine communication such as IoTa protocol support e.g. via channels such as ZigBee. Meanwhile, the Transmission Layer provides UDP (User Datagram Protocol), TCP (Transmission Control Protocol) and SHM (shared memory on the same host) protocol channels for different communication topologies. For ensuring different communication under special scenarios, it can use a hardware accelerator or special functional hardware. For example, under scenario of high throughput and low latency communication on the same host, it may use PoE (Power over Ethernet) hardware to enhance the SHM communication performance, and under deterministic latency scenario, it may use TSN hardware support.

Figure 8:
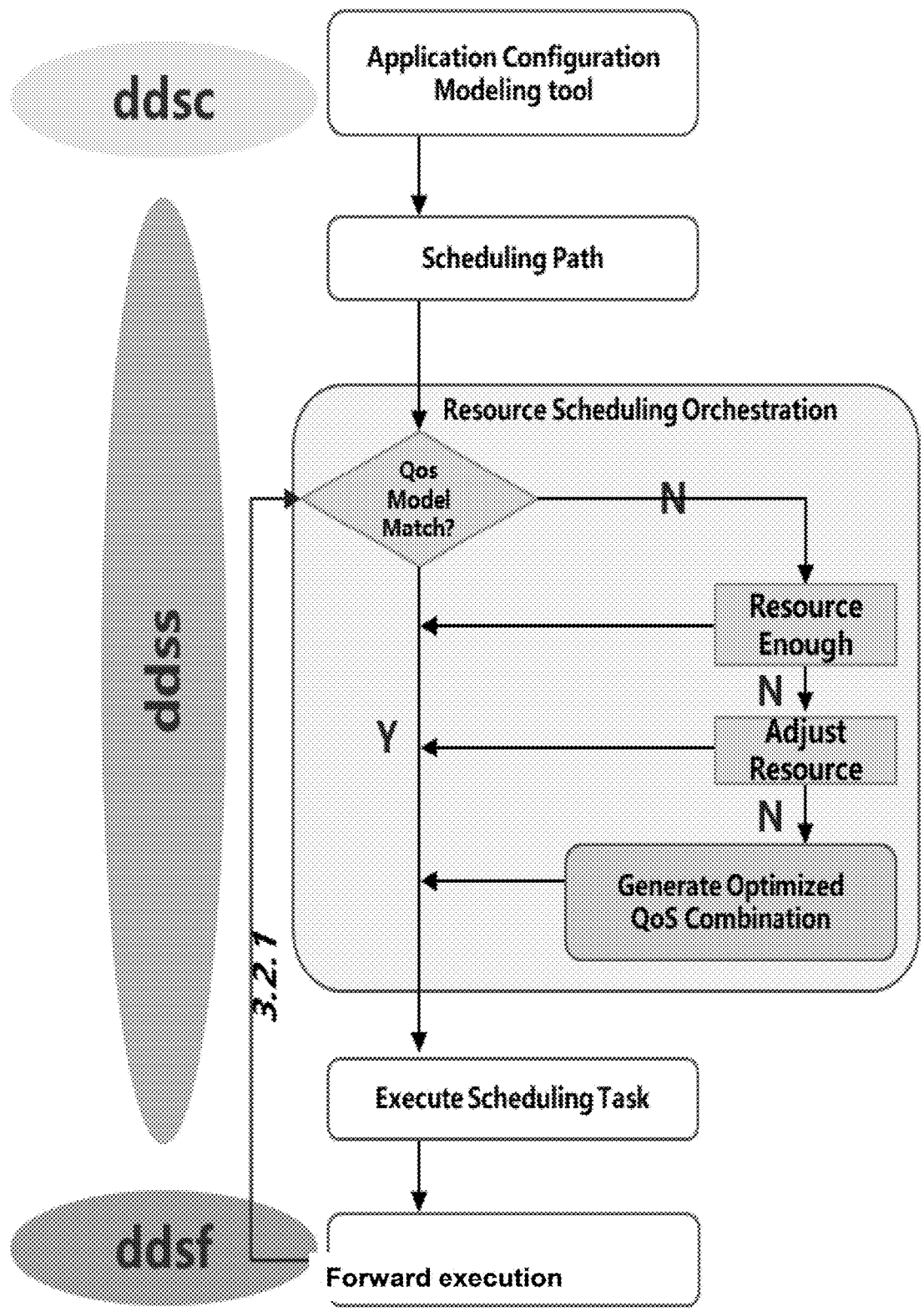
FIG. 8 is a flow chart showing a process flow of resource scheduling and orchestration.

Based on the above description of the software architecture, an algorithm process flow, i.e. a procedure of resource dynamic scheduling and orchestration for application configuration, is shown in FIG. 8. In the Figure, acronyms "ddsc", "ddss", and "ddsf" respectively refer to a (DDS) configurator, scheduler, and forwarder as shown in FIG. 7.

Figure 9:
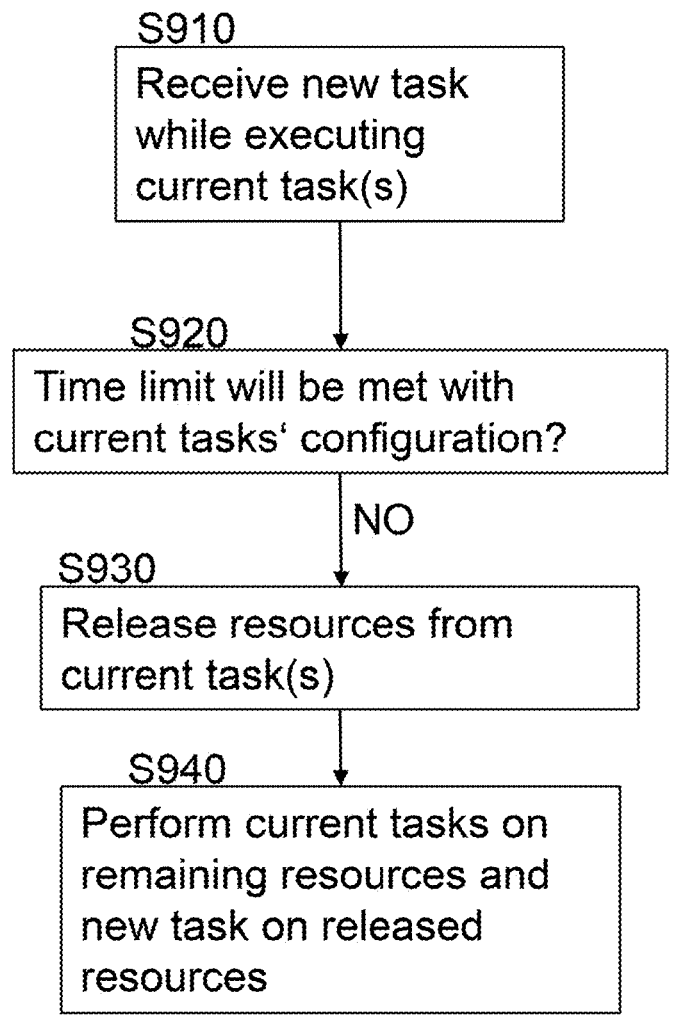
FIG. 9 is a flow chart showing method steps of a data processing method.

The present disclosure provides a data processing method, which is shown in FIG. 9.

The data processing method includes a step of receiving S910 a new task, which is to be performed within a given time limit while one or more current processing tasks are currently being executed. The new task is determined by data of a given amount, which is to be processed by processing resources within the given time limit. Accordingly, the new task includes a data amount (or data size), which is to be processed, and a time limit within which the new task is to be processed. The data size and the time limit in which the task is to be performed (i.e. accomplished) constitute an example of a performance requirement of the task. A performance requirement may further include (hardware) resources (CPU(s), memory, network storage) needed to execute a processing task.

In step S910, the new task is received while one or more current tasks, which have been scheduled before the new task, are being executed, i.e. running on the system resources, in particular on one or more processing tasks' scheduled resources. A task's scheduled resources are the resources that have been assigned (or allocated) to the task in the scheduling of the task. Like the new task, the one or more current tasks are to be performed respectively within one or more current processing tasks' time limits. The current tasks respectively include resource requirements, and the resource requirements include a data amount and a time limit in which the data amount is to be processed. In general, different tasks among the current tasks may differ in their respective resource requirements (or configuration requirements or application requirements), including data size, time limit, and hardware resources, or may include tasks having the same resource requirements. Moreover, the current tasks may include tasks that have been scheduled or started in the same time step, and tasks that have been scheduled or have started running at respectively different time steps.

As the expression "one or more current processing tasks" implies, the number of current processing tasks may be equal to or greater than one. Accordingly, in the current disclosure, wording such as "the current processing tasks' time limits", "the current processing tasks' configurations", and so on are meant to indicate "the current processing task's time (configuration) limit or the processing tasks' time limits (configurations)" and include the case of only one current task having a time limit, configuration, etc.

The current tasks have been scheduled based on one or more current processing tasks' configuration(s) (or "configuration models"). Accordingly a task's configuration determines the task's scheduled resources. A configuration of a task defines how system resources are to be used by the task, e.g. how much data is to be processed per time, e.g. per time step (wherein the length of a time step may be 0.1 ms) for the given task among the one or more tasks or how much resource (e.g. processing circuitry, processor (CPU (central processing unit), memory, network storage, etc.) is to be used respectively per time (e.g. per one or more time steps) by the task. A suitable configuration should be determined or selected for a task in such a manner that the task will be performed (i.e., finished, accomplished) within its time limit, and the resource requirements of the task will be satisfied. For instance, a data rate (data per time, e.g. MB @ ms) corresponding to a given task shall be larger than the data size of the given task divided by the time available before the time limit of the given task. For instance, a configuration model may include a mapping between resource requirements (e.g. 2 MB@1 ms) and system resources (or system capacity) to be allocated to a given task in order to fulfill the resource requirements.

As an example, a configuration including a rate 2 MB/1 ms may be used for scheduling a task having the resource requirement 1 MB @ 1 ms. Accordingly, if a task is executed based on its configuration, the task may for example be finished before its time limit (e.g. one or more time steps ahead the task's time limit).

Typically, a task is performed based on a configuration at a homogenous data rate (or speed) within the temporal granularity of processing. Accordingly, with the above exemplary rate of 2 MB/1 MB, 0.2 MB may be processed in each of 5 subsequent 0.1 ms time steps from scheduling of the task, until the task has finished executing.

However, the present disclosure is not limited to a task running at homogenous data rate when being executed based on a given configuration. For instance, a configuration may further define which time steps are to be used for processing of a particular task, and, as an example, a task may halt after one or more time steps, wait during a pause of one or more time steps and be continued after the pause.

The data processing method further includes a step of determining S920 whether or not it is possible to perform the new task within the new processing task's time limit if execution of the one or more current tasks is continued based on the configuration(s) of the one or more current task(s). It is determined whether a sufficient amount of resources are available for performing the new task within its time limit if resources are used by the one or more current tasks according to their respective configuration(s).

In case it is determined, as a result of step S920, that it is not possible to perform the new processing task within the new processing task's time limit (or to satisfy the new task's configuration requirement) if execution of the one or more current tasks is continued based on the one or more current tasks' configurations, a step of partially releasing S930 the one or more processing tasks' scheduled resources is performed. In other words, the current tasks are rescheduled to continue running on resources remaining after the releasing rather than the complete scheduled resources. However, the partial releasing of the current task's scheduled resource is performed so as to still enable performing the one or more current processing tasks respectively within the one or more processing tasks' time limits on one or more processing task's remaining resources.

Accordingly, resources are released from the one or more current processing tasks, and the released resources are allocated to the new processing task. For instance, resources which the current processing tasks' configurations allocate to a current processing task or, respectively, a plurality of current processing tasks at time steps including time steps within the new processing task's time limit, are released from the one or more current processing tasks and allocated to the new processing task. For instance, among the tasks which are currently running on the system or on a particular system node, one or more or all tasks running in the system or on a system node may be rescheduled with resources being released. For instance, it may be sufficient to release resources from one task currently being executed on a system node. Consequently to the step of determining S930 the second configuration model, the one or more current processing tasks are performed S940 on the one or more current tasks' remaining resources. Execution of the one or more current processing tasks according to their respective configuration(s) is interrupted and rescheduled, and the current tasks (in particular, the remaining processing operations of the current tasks which have not been accomplished on the current tasks' scheduled resources when the new task arrives) are performed on the current tasks' remaining resources. Moreover, the new task is performed on the released resources, i.e. on resources obtained by the partially releasing of the one or more current tasks' scheduled resources.

In the following, an example of data scheduling and data processing according to the above described data processing method will be provided with reference to FIG. 10. In particular, a scheduling algorithm is illustrated based on which a new processing task is scheduled and current processing tasks are rescheduled.

As can be seen from FIG. 10B, current processing tasks are being executed on given system resources (e.g. CPU and memory of a network node), which include a first task ("Task1") and a second task ("Task2"). The performance requirement of the first task is 1 MB @ 1 ms, and the performance requirement of the second task is 2 MB @ 1 ms. In the current example, it is assumed that the first task and the second task have been scheduled to start running at the same time step. The first task and the second task have started executing in the same time step, and the time limits for both the first task and the second task are respectively 1 ms. Accordingly, the deadlines of both the first and the second task expire after the same time step. However, one task among the current tasks may have started running before another task among the current tasks, or have a deadline previous to another current task. In general, the starting time or scheduling time (instance) as well as the respective time limits (deadlines) may differ among current tasks. Moreover, there may be further tasks in addition to the first task and the second task, which are currently running on the same resources (e.g. the same network node) or other system resources.

Moreover, in the present example, it is assumed that the duration of a time step (or the granularity of scheduling) is 0.1 ms. A millisecond subdivided into 0.1 ms time steps is illustrated by FIG. 10A. In FIGS. 10A to 10C, "0.1" denotes the 0.1 ms duration of the processing time steps. However, in general, as already mentioned, the scheduling granularity may be finer (e.g. 0.05 ms) or coarser (e.g. 0.2 ms) than the 0.1 ms shown, depending e.g. on the system's (e.g. the node's) software or hardware performance.

In the present example, the first task and the second task (and possibly further processing tasks) have been scheduled based on respective configurations, namely a first task's configuration and a second task's configuration, which allocate system resources respectively to the tasks. In accordance with and resulting from these configurations, data rates at which the tasks have so far been processed with respective data rates. FIG. 10B shows a current state of execution after 0.2 ms (where time steps of already executed processing is shown by solid lines). Here, the rate of the first task is assumed to be 2 MB/1 ms corresponding to 0.4 MB/0.2 ms already executed (0.4 MB executed at 0.2 ms), and the rate of the second task is assumed to be 2.5 MB/1 ms resulting in 0.5 MB of the second task already executed after 0.2 ms (0.5 MB/0.2 ms). It is further assumed that given processing resources (e.g. of a system or a (network) node within a system) are exhausted by the current tasks while the current tasks are running, and no further idle resources can be used for additional tasks.

In accordance with the current execution progress, if no interrupt and/or rescheduling of the current processing occurs, the first task will finish execution and will be accomplished in the next 0.3 ms in which the remaining 0.6 MB will be processed, and the second task will finish in the next 0.6 ms in which the remaining 1.5 MB will be processed (shown by dashed lines in FIG. 10B).

Thus, after remaining 0.3 ms, the first task will release the resources and will not use the resources for the rest of the time corresponding to 0.5 ms=1 ms−0.2 ms (already executed)−0.3 ms (remaining execution) symbolized by dotted lines. Accordingly, if the first task keeps the resources assigned to it in accordance with the first task's configuration, it can release resources capable of processing 1 MB in 0.5 ms which can then be used for other tasks.

Similarly, the second task will be able to release resources after the remaining 0.6 ms, and in the rest of the time, 0.2 ms=1 ms−0.2 ms−0.6 ms, processing capacity of 0.5 MB can be used by other tasks/processes.

Accordingly, if the first and the second existing tasks are not interrupted, the resources of the first task and of the second task can process (e.g. transfer) an extra data amount of 1.5 MB within rest of time (1 MB on the resources used by the first task, and 0.5 MB on the resources used by the second task).

However, in the current example, it is now assumed that a third task ("Task3") is received as a new processing task having a resource requirement of 0.8 MB @ 0.5 ms when the current tasks (first task and second task) have been running for 0.2 ms. That is, as shown in FIG. 10C, the time limit of the third processing task expires three time steps (0.3 ms) before expiry of the first and the second processing tasks.

In FIG. 10C, the rounded rectangle comprising any time steps corresponding to idle resources that can be allocated to the (new) third task if the processing is continued according to the currently used first configuration model. In particular, the resources being used for the first task can be used for 0.2 ms before the new task's deadline after performing of the first task. In these 0.2 ms, 0.4 MB can be processed, which, however, is not sufficient for satisfying the resource requirement (data volume and time limit) of the third task.

Accordingly, the system does not have enough idle resources for performing the new task, if all current tasks are kept ongoing in the same way and on the same resources and using the same configurations (e.g. the first current task's configuration and the second current task's configuration) as before reception of the new task without modifying the system.

Accordingly, to perform the new task within its time limit, adaptive resource allocation (e.g. rescheduling) is needed. Therein, a condition is to ensure that the first task and the second task finish before their respective deadlines, i.e. within their time limits. However, the first and the second task need not be accomplished faster than required by their time limits.

In the following, it will be shown how many resources can be released from the (first and second) current tasks to the (third) new task.

The first task has 0.8 ms remaining before its deadline (within its time limit), and needs 37.5% of the resources given within its time limit, 37.5%=(1 MB−0.4 MB)/(2 MB/1 ms*0.8 ms), and can release 62.5% (1−37.5%) from the resources given within the remaining 0.8 ms, corresponding to 1 MB processable within 0.5 ms.

The second task also has 0.8 ms remaining before its deadline, and needs 75%=(2 MB−0.5 MB)/(2.5 MB/1 ms*0.8 ms) of the resources given within its time limit, and can release 25% (1−75%) of the given resources within the remaining 0.8 ms, corresponding to 0.5 MB processable within 0.2 ms.

Accordingly, in principle, 1.5 MB of idle resources are available in total that are possibly releasable from the first processing task (1 MB) and from the second processing task (0.5 MB), which is greater than the resources that the new task needs to process (0.8 MB).

The resource requirement of the third task can be satisfied provided that among these 1.5 MB of idle resources, a sufficient amount of resources can be released from within the time limit of the new task (e.g. by slowing down or halting one or more of the current tasks for some time steps and continuing them after the new task has been accomplished, and/or by sharing the resources previously used for one of the current tasks among this one current task and the new task per time step).

For instance, resources are respectively released from the current processing task by performing less processing per time step, e.g. by dividing the remaining data amount among the time steps available within the respective current task's time limit rather than finishing the task several time steps ahead of its deadline like it would do according to its scheduled configuration.

Accordingly, with the above-identified remaining resources, the first task can be rescheduled to continue processing with a rate of (2 MB/1 ms)*37.5%, and the second task can continue processing with a data rate of (2.5 MB/1 ms)*75%. For instance, one or more current processing tasks are continued on fewer resources in parallel with the execution of the new task.

The new (third) processing task is now executed on the resources released from the first task and the second task. Using these released resources, the third task is processed with a data rate that has a maximum value of (i.e. is equal to or smaller than) (2 MB/1 ms*62.5%+2.5 MB/1 ms*25%).

Accordingly, the data amount of the third task that can be processed within the third task's time limit of 0.5 ms amounts to (2 MB/1 ms*62.5%+2.5 MB/1 ms*25%)*0.5 ms=(1.25+0.625) MB/ms*0.5 ms=0.9375 MB, which is greater than the required 0.8 MB that need to be processed by the third task. Thus, with the data rate obtainable from partially releasing the first task's and the second task's scheduled resources, it is possible to perform the third task within its time limit. Rescheduling is performed at runtime. In general, the new configurations after scheduling of the current tasks including the release of resources and the new task does not need to be stored as a new resource configuration. However, the actual resources needed to carry out the new task may be stored, e.g. in a library, and used to estimate future tasks' resource requirements, as will be further described.

The scheduling granularity (i.e. the duration of time steps and the reallocation of current task's resources) as shown in FIG. 10 is merely schematic. The current tasks' scheduled resources may redistributed within each 0.1 ms among the current tasks and the new tasks so that processing is performed in both current and new tasks within each 0.1 ms time step. However, the temporal division may also be performed with a finer or coarser granularity, provided that the current tasks are performed within their respective deadlines.

In the current example of FIG. 10, to meet the new task's deadline, both the first task and the second task release resources and are slowed down. However, in some configurations, it may be sufficient that one or more current tasks (e.g. a subset of the tasks currently running) release resources while one or more further current tasks continue running on their scheduled resources.

The present disclosure is not limited to one or two current tasks currently running when a new task is received. For instance, a hundred or more tasks may be running on the system, possibly on one network node or distributed among a plurality of network nodes, when a new task is received.

Moreover, it is possible that a processing task is rescheduled more than once while it is being executed, depending on the task's latency (time limit), resource requirement, and new tasks that are received while the task is running on the system resources. For instance, a current task may release only a part of the maximum releasable resources when a first new task is arriving, and later release further resources when a second new task is arriving. However, in some embodiments, all tasks release their maximum possible resources when the result of the determination in step S920 is negative and the new task cannot meet its requirements with the current task's original scheduling.

In the previous example of FIG. 10, an example of resource allocation has been shown where it has been determined that it is not possible to perform the new task within its time limit when the current tasks are performed according to the first configuration model.

Figure 11:
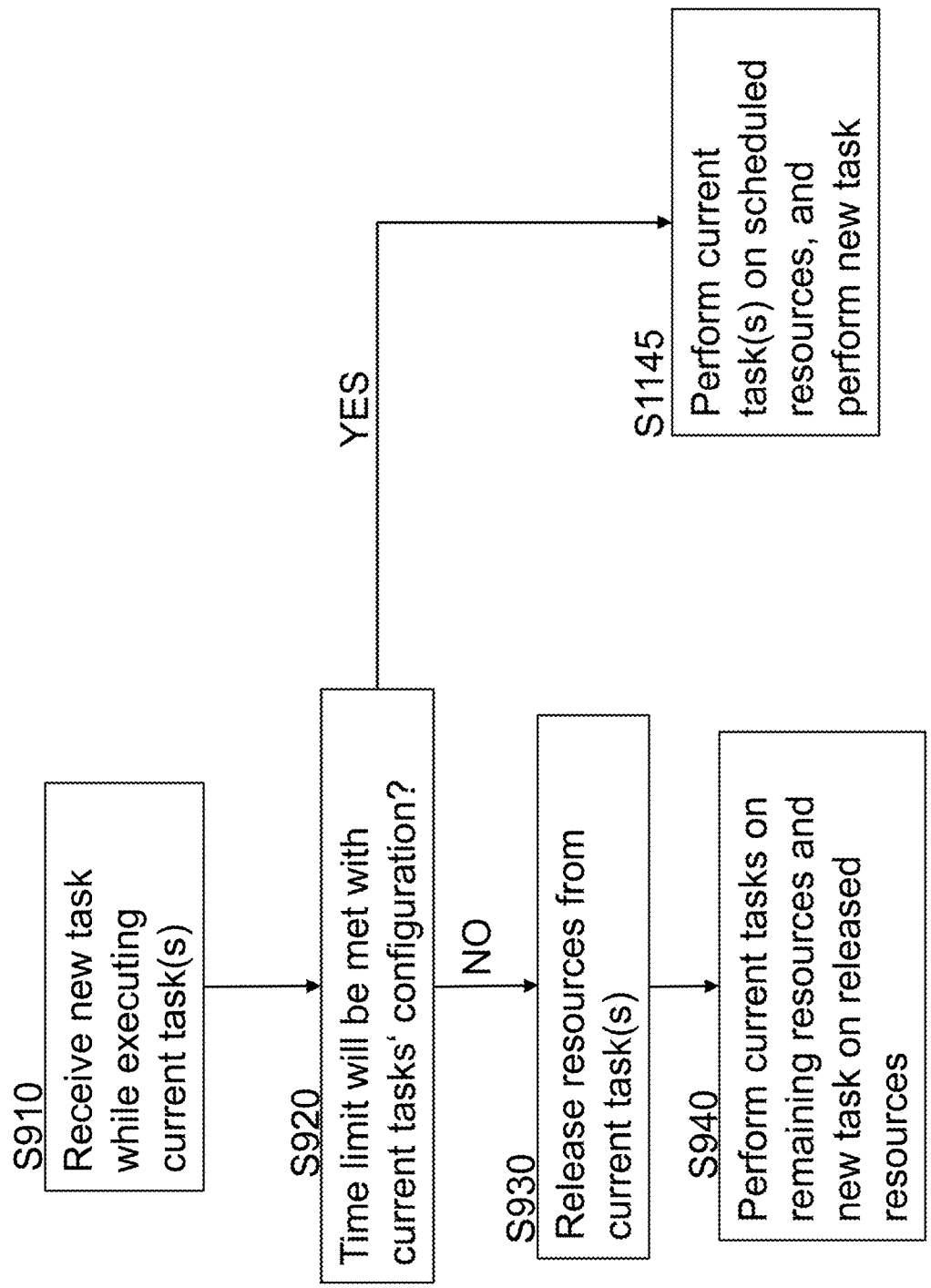
FIG. 11 is a flow chart showing method steps of a data processing method.

However, if it is determined in step S920 that it is possible to perform the new processing task within the new processing task's time limit if the execution of the one or more current processing tasks is continued based on the one or more processing tasks' scheduled resources, execution of the one or more current processing tasks is continued S1145 on the one or more processing tasks' scheduled resources, as shown in FIG. 11. For instance, it is possible to perform the new processing task within the new processing task's time limit if there is still a sufficient amount of idle (or unused) resources within the new task's time limit to perform the new task at a data rate that meets the new task's resource requirement. The new task can be allocated to these idle or unused resources without releasing any resources that are used for the processing of the current tasks in accordance with the first configuration model.

Figures 12, 13:
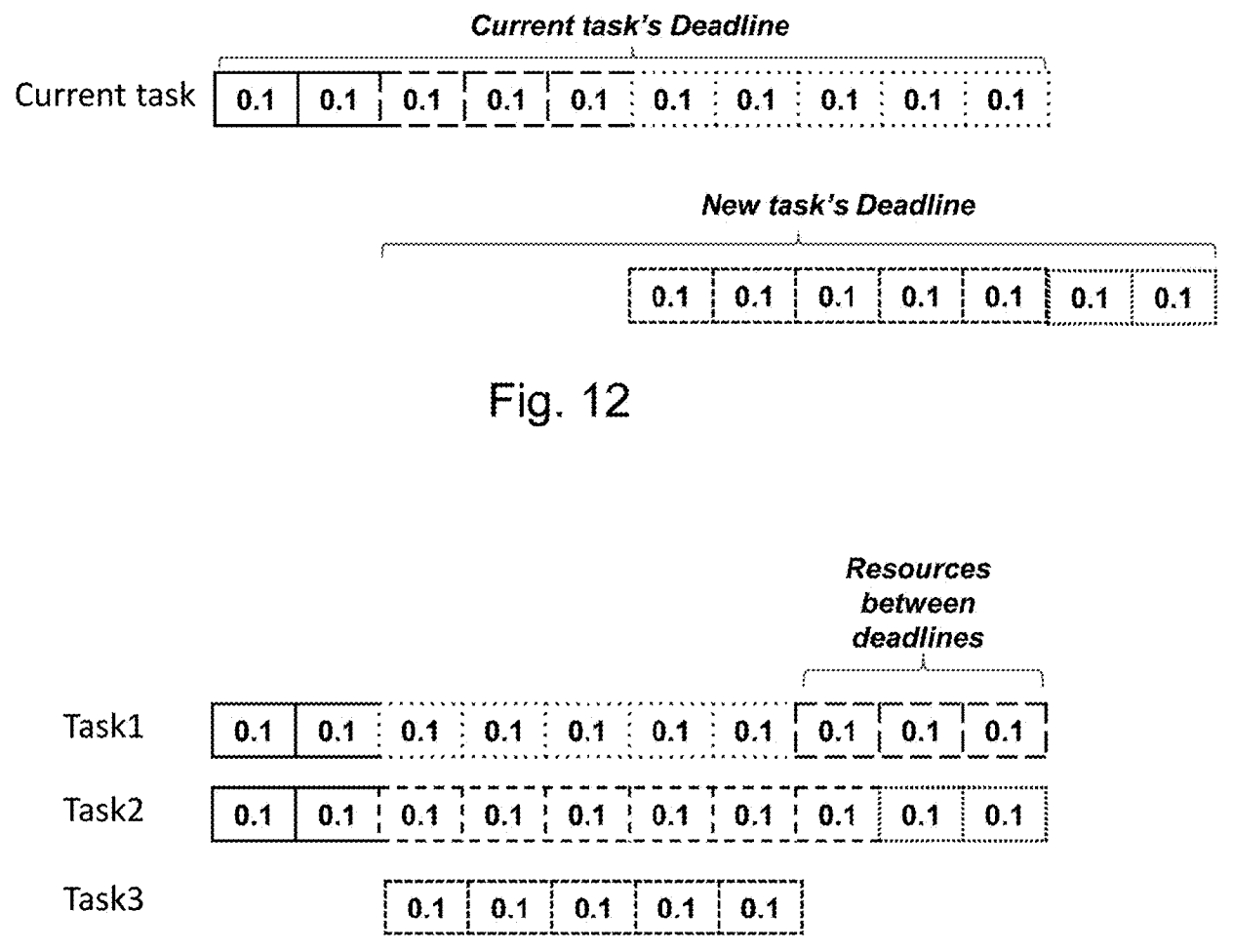

An example where it is possible to continue performing a current task on its scheduled resources according to the current task's configuration is shown in FIG. 12. The resource requirements of an existing (current) task have been defined as 1 MB @ 1 ms. According to a the existing task's configuration, the rate by which the existing task is executed on its resources is 2 MB/1 ms.

When the existing task has been running for 0.2 ms and 0.4 MB@ 0.2 ms have already been executed, a new task is received with the resource requirement 1 MB @ 1 ms. In accordance with the rate by which the existing task is being executed, finishing of the existing task requires 0.3 ms=(1−0.4) MB/(0.4 MB/0.2 ms). Thus, there is a remaining (idle) time of 0.5 ms=(1−0.2−0.3) ms within the existing task's time limit.

Accordingly, the new task matches the current system configuration state including the current task's configuration, and fulfills the resource requirement of being processed within its time limit of 1 ms (i.e. 0.2 ms after expiry of the existing task's 1 ms time limit, since the current task has started 0.2 s before the new task is received). Accordingly, the new task can wait for the existing task to finish and then be executed on the same (i.e. the current task's) resources.

The expected time for the new task to finish is 0.8 ms=0.3 ms (wait)+0.5 ms (execution) from the scheduling.

The above-described example shown in FIG. 12 is a case of a (performance) requirement of 1 MB data with a required deterministic latency (1 ms) corresponding to the deadline/ time limit of the new task. The system configuration including the current task's configuration (model) matches the new task and can be used directly without rescheduling or adaptive resource allocation, and the current available resources can fulfill the performance requirement, so no additional resource is needed to be released.

Before the new task is started, the performance requirement of the existing task is 1 MB@1 ms, and when the new task is received, the existing task's current status of accomplishment is 0.4 MB@0.2 ms. It is made sure that the current running task can be finished within the required time, since the current task requires 0.3 ms, which is 0.5 ms from the start of the current task (finished 0.4 MB@0.2 ms, needs 0.3 ms to finish, maximum configured latency is 1 ms).

Because there is a configuration for the new task, i.e. a real deterministic latency of 1 MB @ 0.5 ms (corresponding to the resources available after finishing of the existing task), the predicted finishing time of the new task is 0.8 ms, including 0.3 ms waiting time for the finishing of the existing task, and 0.5 ms for the new task's execution.

Returning to the example shown in FIG. 10, an example has been shown where resources are released from two current tasks (Task1 and Task2) to be allocated to a new task (Task3).

More generally, in some embodiments, a minimum of the one or more processing tasks' remaining resources is calculated as:

(total data volume−already processed data volume)/
(data rate*remaining time within current processing task's time limit)

respectively per one or more current processing task, wherein the data rate is based on the respective current processing task's configuration. The resources obtained by releasing the one or more current processing tasks' resources are the difference between the one or more current processing tasks' scheduled resources and the one or more current processing tasks' remaining resources.

For instance, according to the present disclosure, the current tasks' remaining resources can be equal to or greater than the minimum of remaining resources provided above. Moreover, as mentioned above, resources may be released from all tasks currently running, or from as subset.

It should be further noted that if there are resources still unused according to the current tasks' configuration, the new task may be performed on resources including the resources still unused. In this case, the new task need not be processed exclusively on resources released from current tasks.

A criterion for a new task to be performable within its time limit is that available resources within the new task's time limit (including resources released from current tasks and/or idle resources), for instance, an obtainable/available data rate times the time interval within the time limit (e.g. the number of time steps) is greater than the data volume/ size of the new task's resource requirement.

Accordingly, in some embodiments, the data processing method further includes a step of determining (checking) whether this criterion is met. Such a checking step may be particularly beneficial in the case of a high-priority processing task. For instance, if it is determined that the criterion is not met even if releasing and rescheduling is performed, the new task may be routed to another node and/or another path in order to meet its latency requirement.

However, it is noted that rescheduling may also be beneficial if the above-identified criterion is not fulfilled for each newly incoming task. In particular, if according to a requirement a new task is prioritized with respect to current tasks, resources from the current tasks may be released, and the new task is allocated to these released resources. On a statistical level, e.g. when a hundred or more tasks are being executed, such rescheduling may enhance processing efficiency even some current tasks (in particular, less critical tasks) cannot be executed within their time limits.

In the description of the example shown in FIG. 10, it has been assumed that after rescheduling, the data of the current task is homogenously divided among the time steps remaining within the current task's deadline (for instance, 37.5% of 0.2 MB rather than 0.2 MB are processed per 0.1 ms).

However, according to some embodiments, it is also possible that if the new task's deadline expires before one or more current tasks' deadlines, it is also possible that one or more current tasks are halted, the new processing task is processed within its deadline, and the one or more processing tasks are resumed after the new task has been accomplished. This is shown in FIG. 13 where a first and a second current task and a new task are to be processed in accordance with the performance requirements and starting times of the example from FIG. 10. As indicated by dotted lines in FIG. 13, the first task is halted, and the new task is performed on the resources obtained from halting the first current task. In other words, accomplishment of the first current task is postponed to the resources between the new task's deadline and the current task's deadline.

In particular, if halting of one or more current tasks is allowed, a criterion for rescheduling being possible for accomplishing the new task as well as the one or more current tasks respectively within the new task's and the current tasks' time limits is as follows: idle resources after the new task's time limit but within the one or more current tasks' time limits are greater than the difference between the data volume of the new task and idle resources of the current tasks within the new task's time limit.

In the latter criterion, "idle" resources mean unused resources according to the first configuration model, i.e. resources not used for processing after the respective task would be accomplished in the first model. Moreover, resources have the dimension of data size per time step. Moreover, the data volume of the new task corresponds to the data size defined by the new task's resource requirement to be processed within the new task's time limit. In FIG. 10C, the resources after the new task's time limit but within the one or more current tasks' time limits are denoted as "resources between deadlines".

If the latter criterion is satisfied, it is possible to release resources within the new task's time limit, which would be used by the current processing task(s) according to the first configuration model, and allocate these resources to the new processing task. Then, the corresponding processing operations of the current task(s) is for instance halted (or could still be slowed down, depending on the resources needed) and continued after the new task has been processed with the originally scheduled rate.

Accordingly, in some embodiments, a data processing method may, when it has been determined in step S920 that it is not possible to perform the current task within the new task's time limit if the execution of the current tasks is continued based on the first configuration model, further include a determination whether or not the above criterion latter criterion is satisfied, to determine whether a new task can be satisfied if current tasks are halted or postponed.

As mentioned, the resources required for processing a task may comprise different types of resources, such as CPU, memory, or network storage. However, with respect to tasks' data rates and resources released from tasks, it is sufficient to provide a single value (e.g. a data rate or a percentage of resources to be released) of resources. In other words, it is not required to provide respectively resource requirements, configurations, etc. separately for different resource types (CPU, memory, etc. . . . ) because the actual usage of different resource (e.g. hardware) components can be determined on the operation system level. However, in general, the present processing method can also be performed separately for respective hardware resources.

Figure 1:
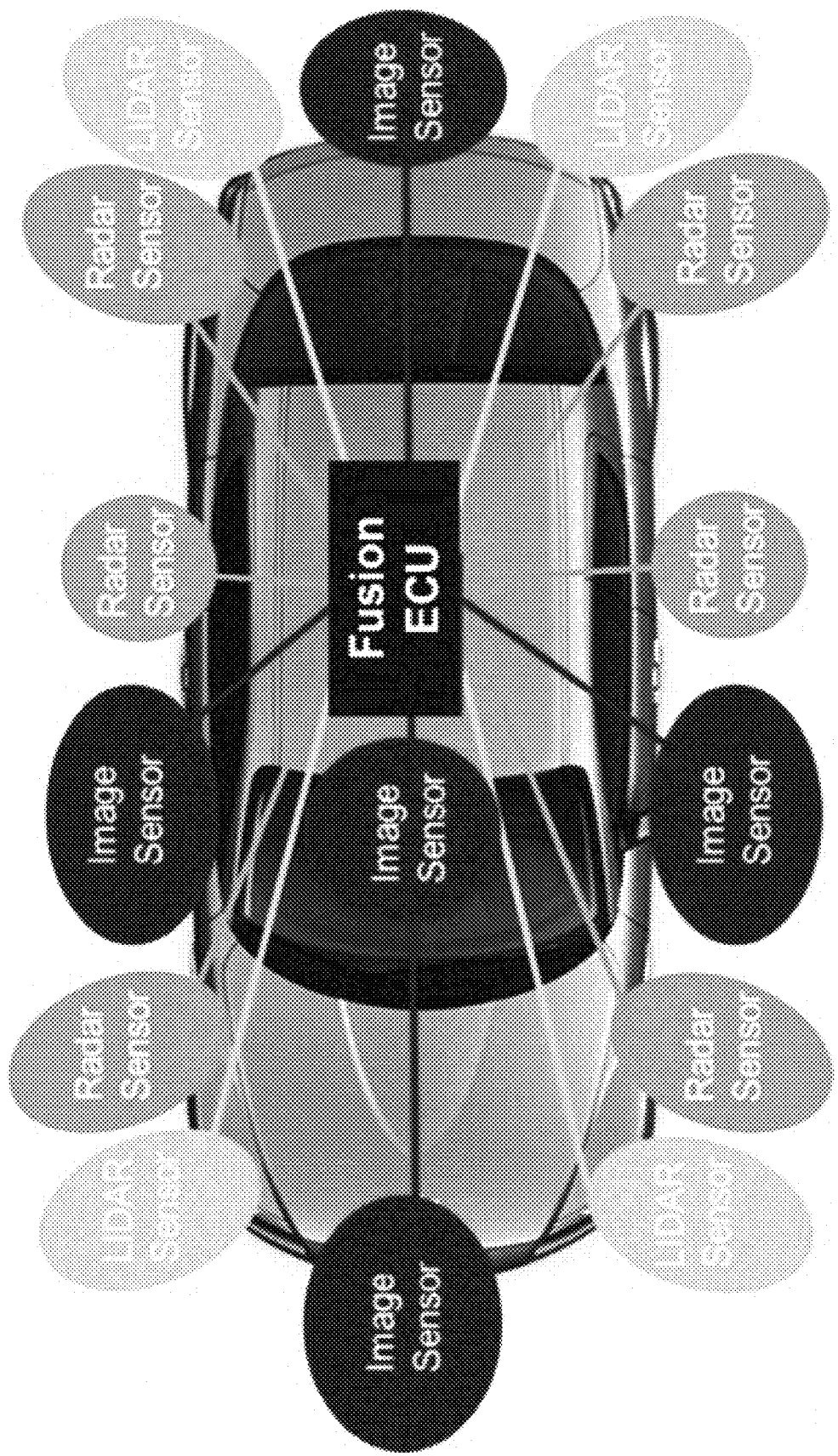
FIG. 1 is an illustration of sensors of an autonomous driving vehicle.
Figure 2:
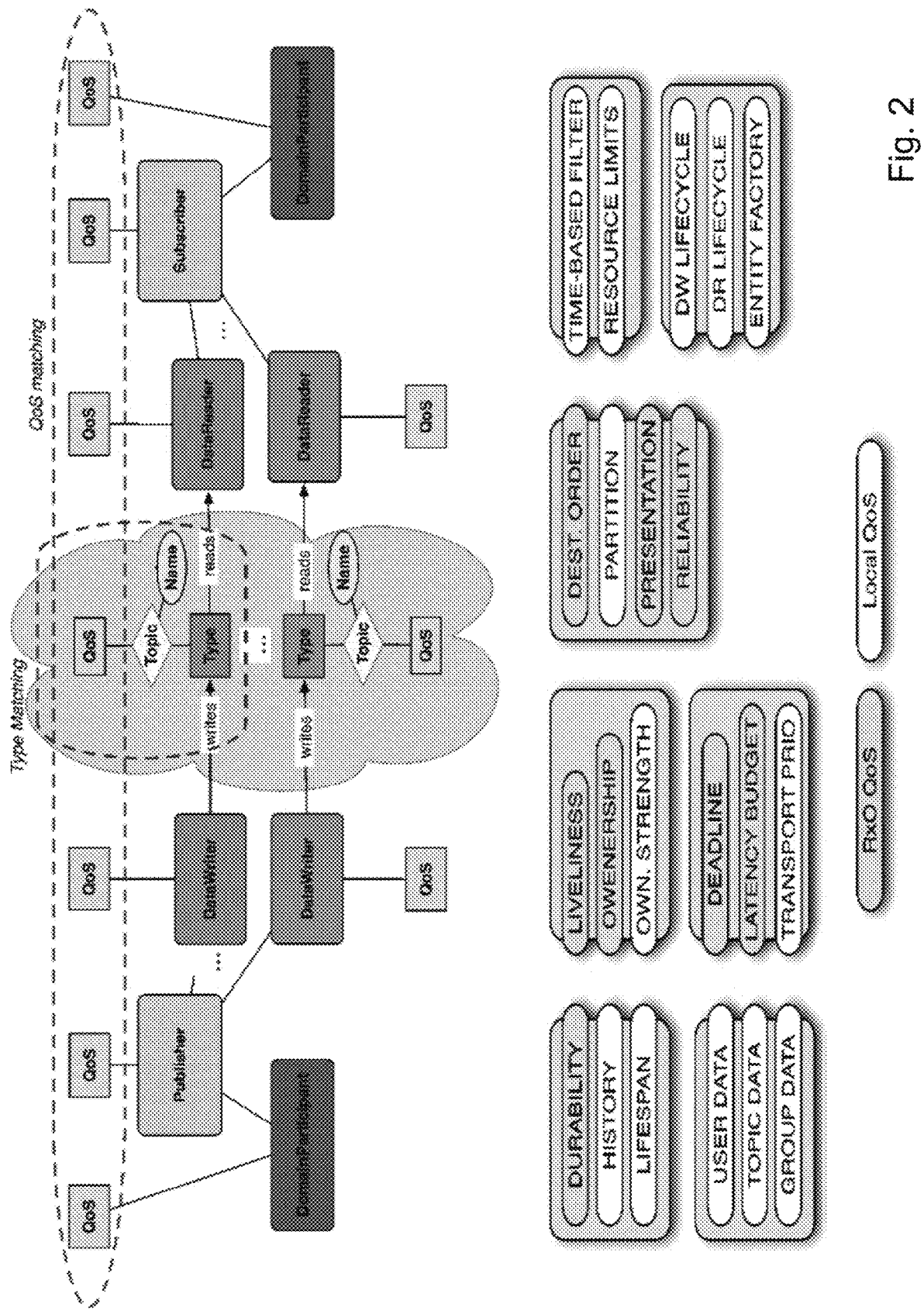
FIG. 2 is a graph illustrating QoS (Quality of Service) in the DDS (Distributed Data System) standard.
Figure 4:
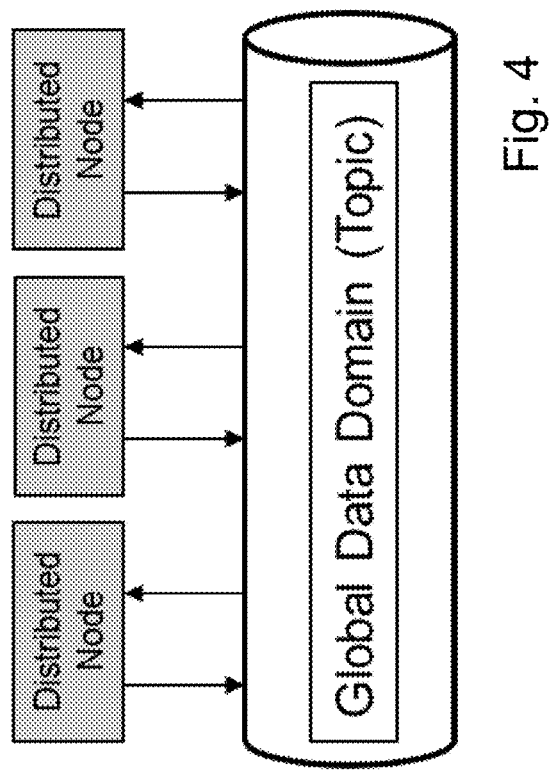
FIG. 4 is a schematic graph of decentralized DDS architecture.
Figure 3:
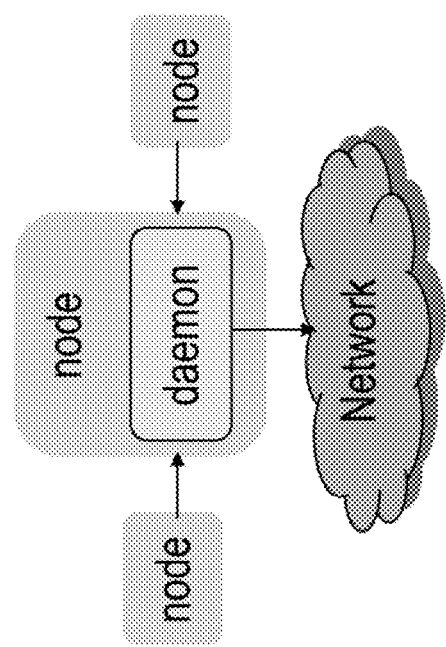
FIG. 3 is a schematic graph of centralized DDS architecture.
Figure 5:
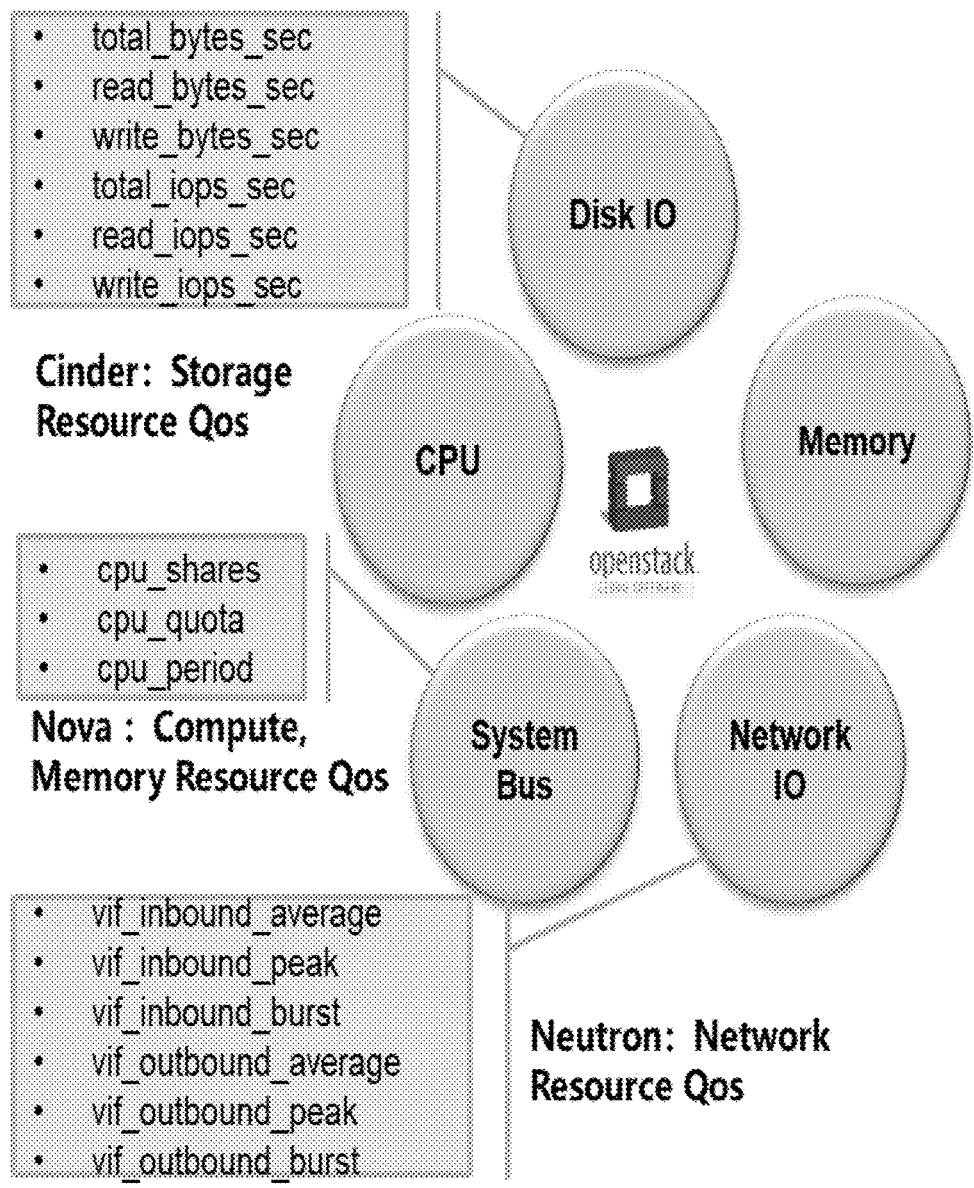
FIG. 5 is an illustration of QoS of OpenStack resources.
Figure 6:
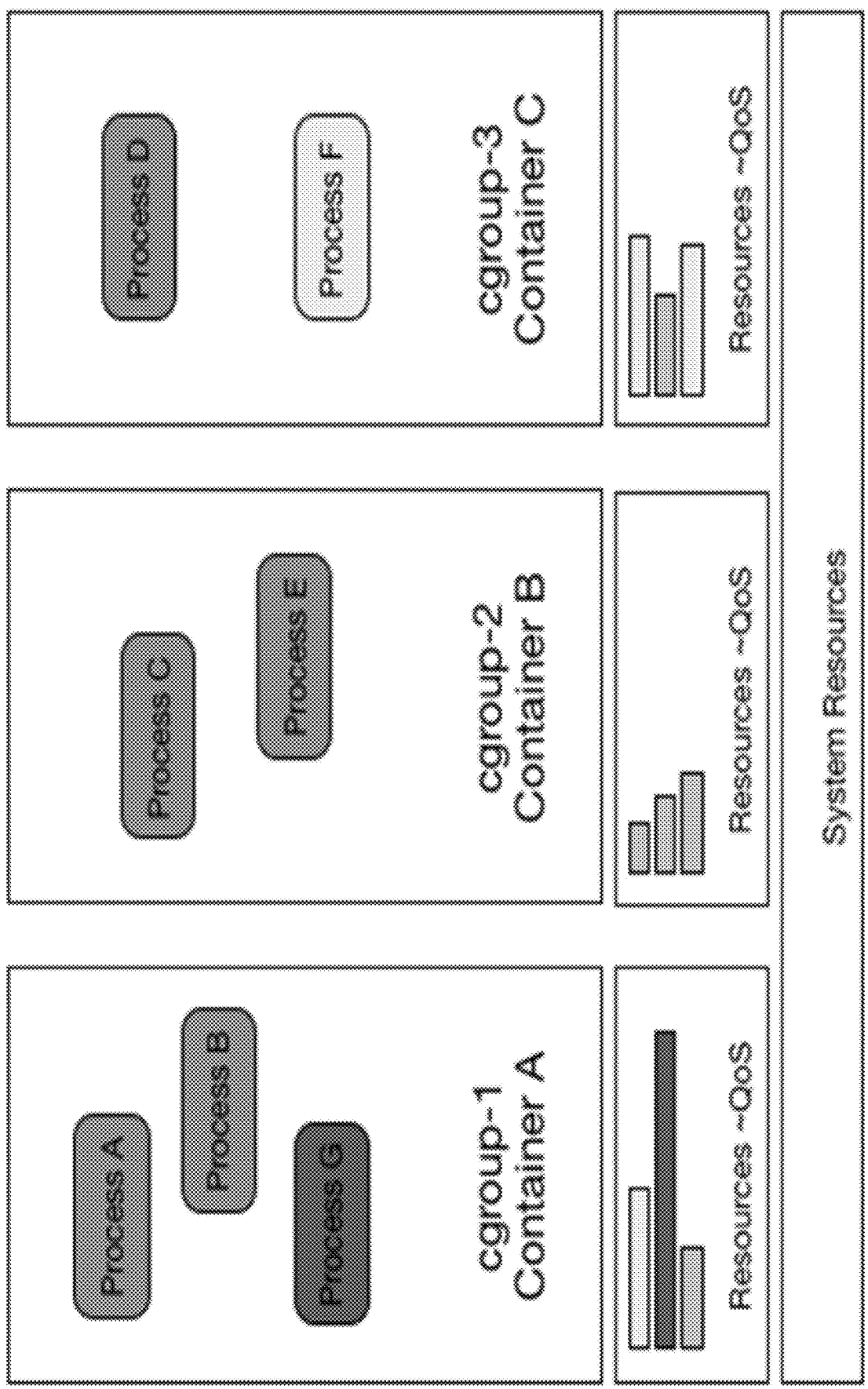
FIG. 6 is an illustration of QoS of Docker resources.

In some embodiments, the processing method further includes translating the new processing task and the new processing task's time limit (as well as possibly the one or more current tasks and their respective time limits) into a quality of service, QoS, requirement. For example, the QoS requirement may correspond to a QoS among QoS from DDS shown in FIG. 2 (e.g. deadline, reliability, resource limits). Accordingly, on the Application Perception Layer shown in FIG. 7, it may be sufficient to define a task's performance requirement in terms of a data amount and a data volume, without using a language of the QoS such as DDS. For instance, translation into QoS may be performed by the Resource QoS Abstraction Model of the Logical Scheduling Layer shown in FIG. 7. Because the QoS specific language is not required at the Application Perception Layer, this may facilitate application development.

In some embodiments, the new processing task and the one or more current processing tasks are performed within a resource scheduling simulation. Such a resource scheduling system may be used to develop or to expand a library of resource configurations that may be used for scheduling a task, e.g. an AI, artificial intelligence, training library in which configuration models are stored. For instance, the library may include configuration models obtained from a simulation of a resource scheduler and/or from the actual (real-time) use of a (possibly commercial) system where actual processing tasks are performed. The use of a simulation to generate configurations/configuration models to be included in the library may facilitate providing and predefining a sufficient amount of configuration models for multiple combinations of current task and a newly received task with various performance requirements, available resources, and current execution states of the current tasks.

As mentioned above, the actual resources needed to carry out the new task may be stored, e.g. in a library, and used to estimate future tasks' resource requirements, as will be further described.

In particular, in some embodiments, the data processing method further includes measuring resources on which the new processing task is performed. E.g. while the new processing task is performed, possibly in parallel with the one or more current processing tasks, the resources on which the task is running including time taken for actually performing the new task are kept track of and (at least temporarily) stored. Based on the measured resources, a new processing task's configuration is obtained, and the new processing task's configuration is added to the above-mentioned library.

Therein, to obtain the new library entry, the new task may be either a task in a simulation or a task of an actual application, for example in a network or a data processor of an autonomously driving vehicle.

Moreover, in the determining of the new task's configuration, the new task's configuration may be determined based on more executed tasks than one task. For instance, the new task's configuration may be determined based on a measured resources of a plurality of performed tasks having the same or similar resource requirements including the new task, for instance 1000 performed tasks. From the resulting measured resources (e.g. latency/time needed) the five percent smallest values and the five percent largest values may be discarded, and an average may be taken from the remaining results. The average may be taken to generate a new library entry corresponding to the new processing task's configuration.

However, for the library entry, an extra resource (for example, additional 0.5 ms) may be added to the calculated average as a cushion. By adding an additional resource, reliable accomplishment of future tasks using the new task's configuration may be facilitated. Moreover, releasing resources from future tasks using the configuration may be facilitated by the additional resource.

Accordingly, it is possible to train the system and to add new configuration models to the library. Thus, the system efficiency may be increased while the system is being used. The training may be performed in a development phase of the system and/or in the operation of products (possibly after they have been sold). Moreover, in some embodiments, at least one of the new processing task and the current processing task(s) is a communication task. For instance, data processing in accordance with the present disclosure is performed by a DDS publisher.

Data processing, as provided by the present disclosure, may be applied to a network comprising a plurality of network nodes. According to some embodiments, the data processing method includes determination of a communication path including a plurality of nodes by which the data is to be transferred. Therein, a node self-discovery mechanism may be used. On a first node among the plurality of nodes, the task is performed as the above-described new processing task. Moreover, a communication protocol is selected for forwarding the data from the first node to a second node included in the communication path. After performing the new processing task on the first node, the data is forwarded to a second node using the selected communication protocol.

For example, data scheduling and possible rescheduling, as described above and including the method steps described above and shown in FIGS. 9 and 11, may be performed respectively for each node of a path that has been determined and selected beforehand.

However, in some embodiments, the present disclosure may be used in the determination of a data processing path to be used. For instance, the determining S920 whether it is possible to perform a new task within the new task's time limit may be performed to identify, among a plurality of paths respectively comprising one or more network nodes, a "best" or optimal (e.g. a fastest path or a most resource saving path) on which a data transfer (e.g. from an application to DDS publisher/subscriber interface) on which transfer of a given data packet is currently possible in addition to further data being transferred in the network.

Returning to FIG. 8, five steps of an exemplary algorithm process flow of resource dynamic scheduling and orchestration for application configuration according to will be provided in the following:
1. The latency, performance, reliability criteria, and communication targets are defined, and a configure tool (e.g. an application configuration modeling tool comprised by the configurator shown in FIG. 7) verifies the criteria that user defined according to the limitation of hardware resources (ddsc). For instance, based on the criteria defined by the user, the processing task including the performance requirements and the time limit are determined.
2. Based on the node self-discovery mechanism, the network topology is determined by all the nodes, and the best communication paths are calculated (ddss). For instance,
   a. Nodes on the same host will use SHM (shared memory); and/or
   b. Nodes on different hosts will take the network latency between hosts and the topology into account for selecting the best path.
3. According to the current available resources and the guarantee of the accomplishment of current running business (for instance including the one or more current processing tasks), the minimum required resource for the communication and the maximum available resource is determined, and the optimized QoS combination (ddss) generated. Therein, the following steps are performed.
   a. Scheduling based on the existing models: an AI training model library is combined with the new task, and the new task is matched firstly with configuration models defined in the library. For example, the model library has been trained with a plurality of cases, and 90% of the cases are taken as reference. In particular, training is performed to identify a matching configuration model for a task's resource requirement, i.e. for determining (estimating, predicting) how many resources are needed for a task having a resource requirement of 2 MB@1 ms defined in a configuration received from the configurator. For instance, a 1000 (or another number) of AI training runs are performed wherein respective values of data rates are obtained. From among the values, the minimum 5% and the maximum 5% are cut (discarded), and the remaining 90% of results are taken as a configuration model's data processing rate corresponding to a resource requirement.
   b. Scheduling is performed based on new models if there no existing model matches, and the scheduling is performed using the following mechanism:
      i. If the resources (i.e., idle resources not allocated to any processing task) are enough, the scheduling is done as required plus fixed extra resource; the resulted configuration may be added into the training library as a new model. For instance, a library may contain resource requirements (e.g. 2 MB @ 1 ms) corresponding to a task, and may further contain a resource configuration (CPU, memory, etc.) matching the resource requirements. However, sometimes a task is received without a resource configuration being included in the library. Accordingly, an estimated resource configuration is determined, which may include an additional resource (fixed extra resource) to ensure that the task works. After the task has been performed by the system, the resource requirement and the corresponding resource is added into a library (one item is added into a configuration file). This new configuration item can be used the next time when a similar or same task or a task having the same resource requirement is received. For instance, the present case i) corresponds to the case where it is determined to be possible to perform the new task if the current task(s) are continued to be executed based on the first configuration model. Then, the performance requirements and the resources are added to the first configuration model to obtain, based on the first configuration model and the additional task/entry, an enhanced configuration model which is added to a library.
      ii. If there is not enough resources, then the resources need to be adjusted with different algorithms according to the user defined abstraction:
         1. It is predicted (determined) whether the currently used scheduling will satisfy the new task's requirement. This is the case if before the new task's deadline, the planned to be finished current tasks will be finished before their deadlines and can be downgraded to obtain sufficient resources to finish the new task as well as on resources originally assigned to the current task. If this is satisfied, then the new task waits until the current task finishes (see the example of FIG. 12 and the related description).
         2. According to the percentage and predicted finishing time of the current task(s), a maximum releasable resource is determined by adjusting resources (and possibly QoS), in accordance with the above description of FIGS. 10A-C. For example, it is a current task's requirement to finish in 1 MB data transmission in 1 ms, and according to a currently used (first) configuration model it is possible to finish 0.5 MB in 0.1 ms, the other 0.5 MB can be finished in any time step(s) within the rest of 0.9 ms, and further resources can be released.
      iii. An optimized combination of configurations (e.g. QoS combination) is generated, and a minimum required resource is utilized in accordance with the new configuration.
4. The specific communication task is executed (in accordance with step S940 or S1145).
5. According to the calculated best path, a corresponding communication protocol is for further forwarding (ddsf).

In addition to the above described data processing method according to any of its various embodiments, the present disclosure further provides a data processing system comprising a circuitry adapted to carry out the method steps according to any of the above-disclosed embodiments. The data processing system may for instance be an entire network or a network node. The present disclosure may be realized by hardware, software, or by hardware/software combinations. The processing circuitry may comprise an integrated circuit or a plurality of integrated circuits.

In addition, the present disclosure provides a computer program comprising instructions, which, when the program is executed by a computer, cause the computer to carry out the steps of the method according to any of the disclosed embodiments.

Furthermore, the present disclosure provides a data carrier having stored thereon the above-disclosed computer program. For instance, the data carrier may be a computer readable non-transitory storage medium having stored thereon the above-disclosed computer program, or a data carrier signal carrying the above-disclosed computer program.

The present disclosure relates to a data processing method, and apparatus for efficient resource usage and faster accomplishment of data processing tasks. A data processing method disclosed herein includes determining whether or not it is possible to perform a new processing task within the new processing task's time limit if execution of one or more current processing tasks is continued based on the one or more current processing tasks' configurations. In case the new task's performing is determined not to be possible within the new task's time limit, resources are released from the current tasks so as to still enable performing the current tasks within their respective time limits.

What is claimed is:

1. A data processing method, the method comprising:
   receiving a new processing task to be performed within a new processing task's time limit while one or more current processing tasks are being executed on one or more current processing tasks' scheduled resources, the current processing tasks having been scheduled respectively based on one or more current processing tasks' configurations and which are to be performed respectively within one or more current processing tasks' time limits;
   determining whether or not it is possible to perform the new processing task within the new processing task's time limit in a case that execution of the one or more current processing tasks is continued based on the one or more current processing tasks' configurations;
   based on determining that it is determined that it is not possible to perform the new processing task within the new processing task's time limit in the case that execution of the one or more current processing tasks is continued based on the one or more current processing tasks' configurations, partially releasing the one or more current processing tasks' scheduled resources so as to still enable performing the one or more current processing tasks respectively within the one or more current processing tasks' time limits on one or more current processing tasks' remaining resources;
   performing the one or more current processing tasks on the one or more current processing tasks' remaining resources; and
   performing the new processing task on released resources obtained by the partially releasing of the one or more current tasks' scheduled resources,
   wherein a minimum of the one or more current processing tasks' remaining resources is calculated as:
   (a total data volume an already processed data volume)/(a data rate * a remaining time within a current processing task's time limit),
   respectively per the one or more current processing tasks,
   wherein the data rate is based on the respective one of the current processing tasks' configuration,
   wherein the one or more current processing tasks' time limits comprise the current processing task's time limit, and
   wherein resources obtained by releasing the one or more current processing tasks' resources are a difference between the one or more current processing tasks' scheduled resources and the one or more current processing tasks' remaining resources.

2. The data processing method according to claim 1, the method comprising:
   based on determining that it is possible to perform the new processing task within the new processing task's time limit in the case that execution of the one or more current processing tasks is continued on the one or more current processing tasks' scheduled resources, continuing execution of the one or more current processing tasks on the one or more current processing tasks' scheduled resources.

3. The data processing method according to claim 1, further comprising:
   translating the new processing task and the new processing task's time limit into a quality of service (QoS) requirement.

4. The data processing method according to claim 1, the method comprising performing the new processing task and the one or more current processing tasks within a resource scheduling simulation.

5. The data processing method according to claim 1, further including:
   measuring resources on which the new processing task is performed;
   based on the measured resources, obtaining a new processing task's configuration; and
   adding the new processing task's configuration to a library.

6. The data processing method according to claim 1, wherein at least one of the new processing task and the one or more current processing tasks is a communication task.

7. The data processing method according to claim 1, further comprising:
   determining a communication path including a plurality of nodes by which data is to be transferred, wherein the data is processed on a first node among the plurality of nodes by performing the new processing task, and the data processing method comprises:
   selecting a communication protocol for forwarding the data to a second node of the plurality of nodes, and
   after performing of the new processing task, forwarding the data to a next node using the selected communication protocol.

8. A data processing system comprising processing circuitry adapted to carry out the method steps according to claim 1.

9. A non-transitory computer readable medium comprising a computer program comprising instructions which, when the computer program is executed by a computer, cause the computer to carry out the steps of the method according to claim 1.

* * * * *

UNITED STATES PATENT AND TRADEMARK OFFICE
CERTIFICATE OF CORRECTION

| | |
|---|---|
| PATENT NO. | : 11,323,541 B2 |
| APPLICATION NO. | : 17/075397 |
| DATED | : May 3, 2022 |
| INVENTOR(S) | : Wang et al. |

It is certified that error appears in the above-identified patent and that said Letters Patent is hereby corrected as shown below:

In the Claims

Claim 1: Column 19, Line 47: "(a total data volume an already processed data vol-" should read -- (a total data volume - an already processed data vol- --.

Signed and Sealed this
Thirteenth Day of September, 2022

Katherine Kelly Vidal
*Director of the United States Patent and Trademark Office*